Feb. 18, 1936.   G. B. SCHEIBELL   2,031,074
AUTOMATIC PROGRAM SYSTEM
Filed March 12, 1931   3 Sheets-Sheet 1
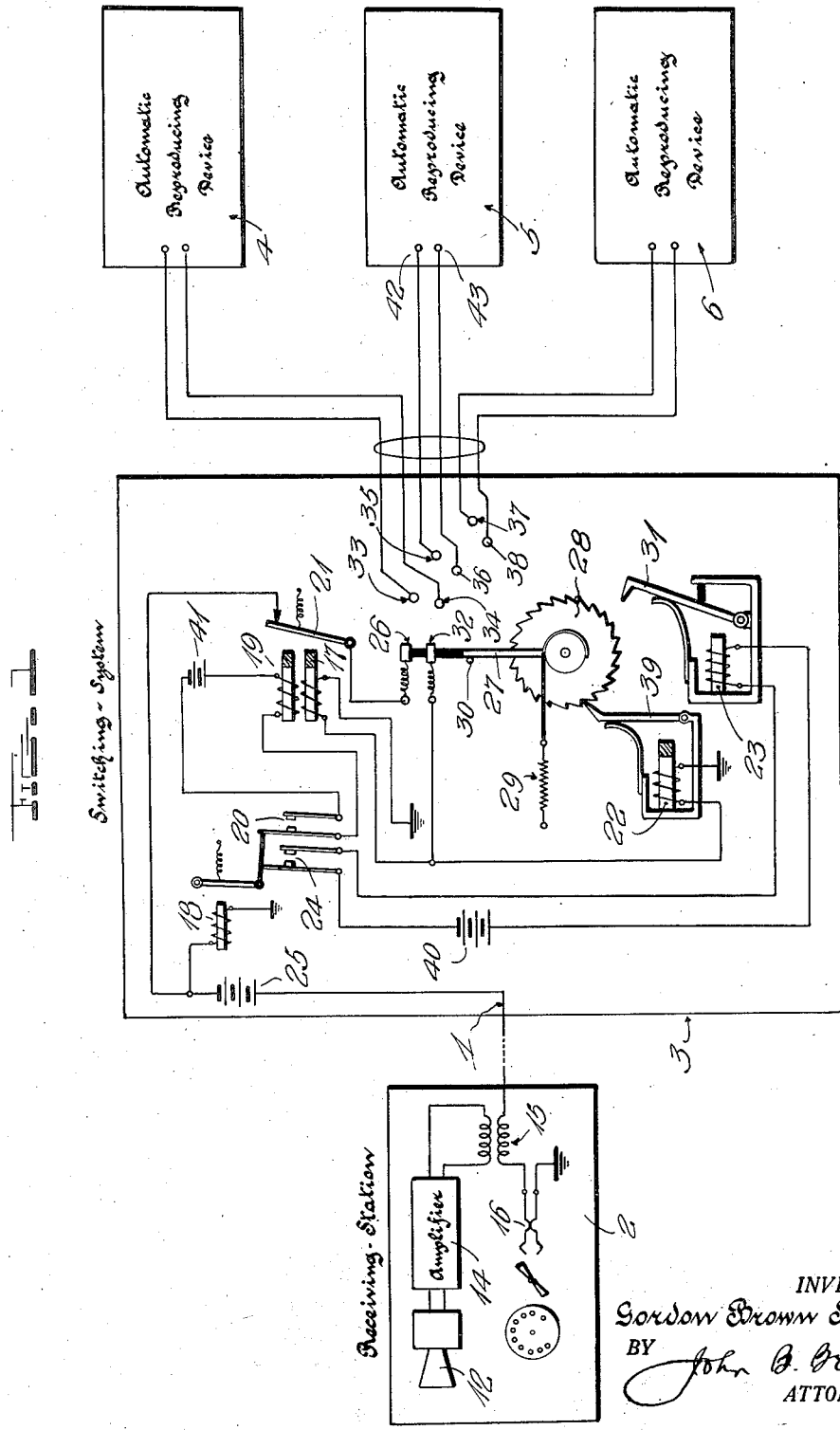
INVENTOR.
Gordon Brown Scheibell,
BY John B. Brady
ATTORNEY.

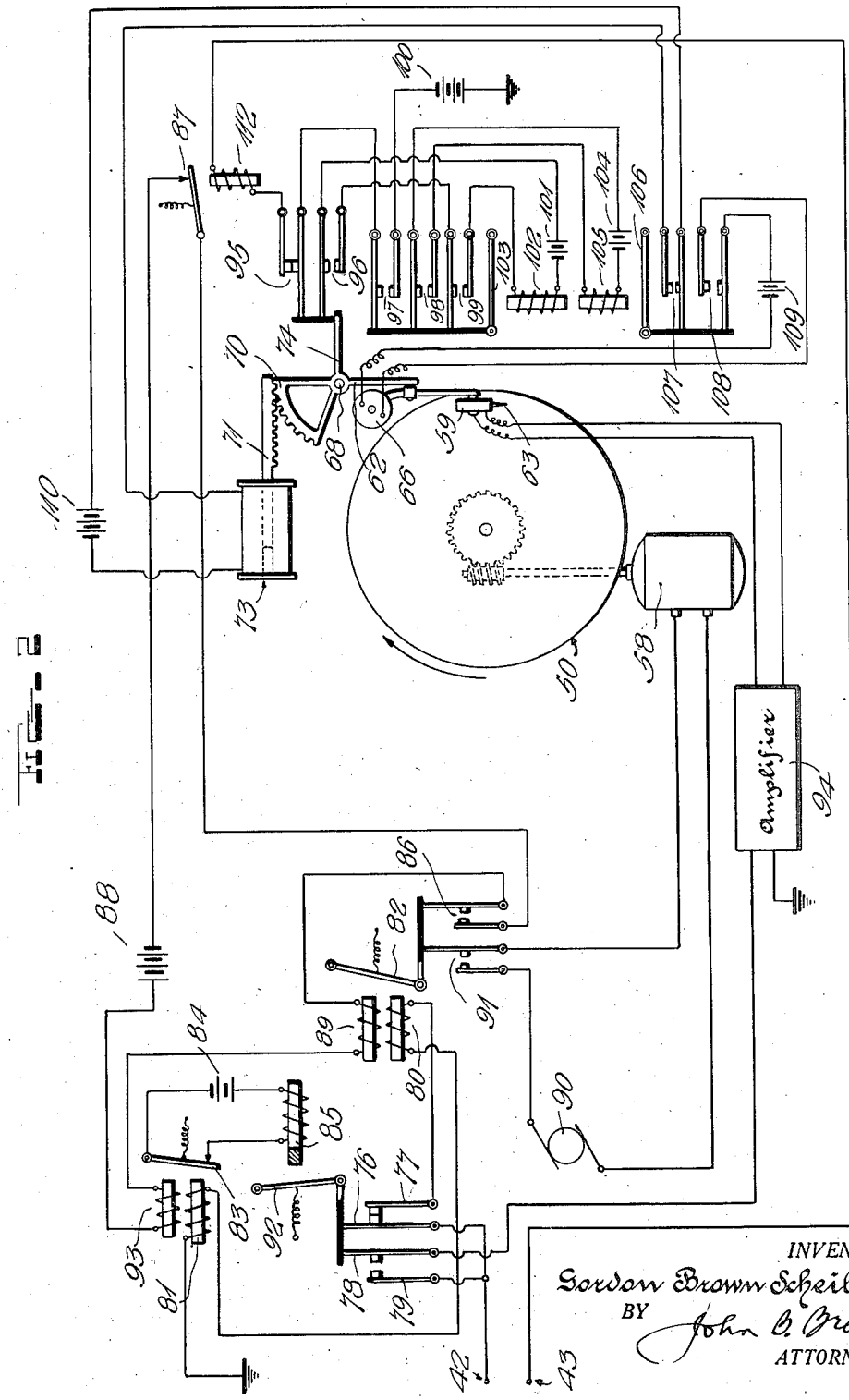

Feb. 18, 1936.  G. B. SCHEIBELL  2,031,074
AUTOMATIC PROGRAM SYSTEM
Filed March 12, 1931  3 Sheets-Sheet 3
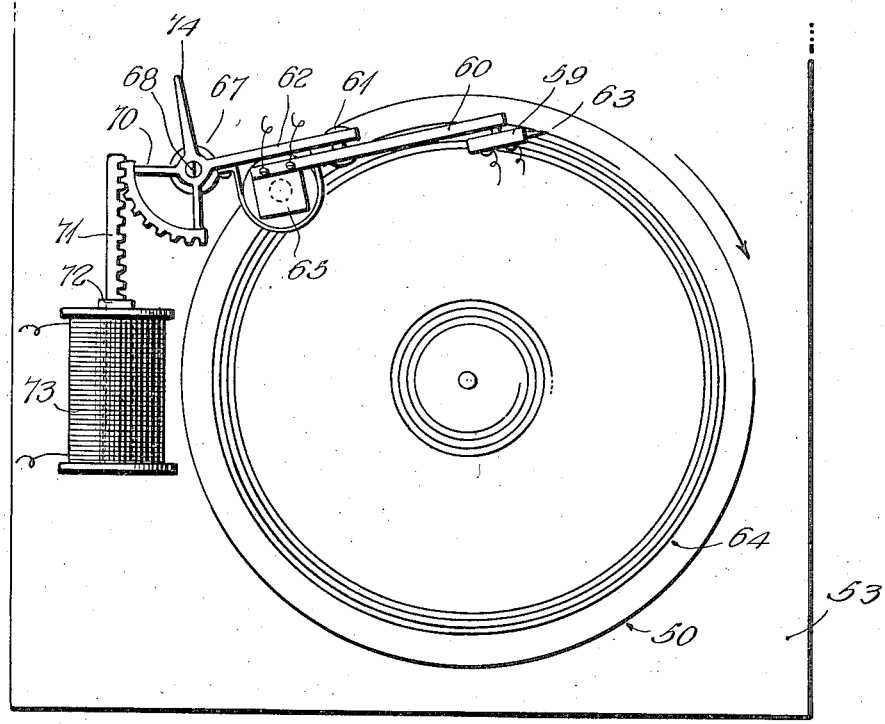
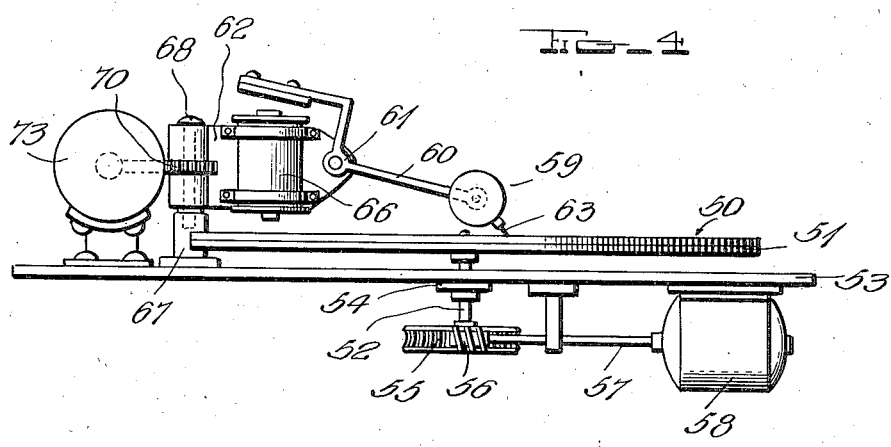
INVENTOR.
Gordon Brown Scheibell,
BY John O. Brady
ATTORNEY.

Patented Feb. 18, 1936

2,031,074

UNITED STATES PATENT OFFICE 2,031,074

AUTOMATIC PROGRAM SYSTEM

Gordon Brown Scheibell, Newark, N. J.

Application March 12, 1931, Serial No. 522,091

19 Claims. (Cl. 179—100.4)

My invention pertains in general to systems in which programs are distributed over wires to a receiving station, and more particularly to that type of program distribution system in which the selection of the program is under control of automatic means operated from the receiving station.

One of the objects of this invention consists in providing an automatic program system in which any one of a plurality of recorded programs can be selected for transmission to a receiving station.

Another object of my invention consists in producing a system in which an operator at a receiving station can select a desired program from a plurality of recorded programs by automatic switching apparatus under control of an impulse device.

A further object comprises in producing a system in which an impulse device controls the selection of one of a plurality of phonograph recordings and in which circuit disconnection means are controlled by the limit of movement of the phonograph recording.

I accomplish the above desirable objects in a novel automatic program system having a step-by-step selector under control of an impulse device and which is adapted to selectively connect a translating device to any one of a plurality of automatic reproducing devices.

In the drawings which accompany and form a part of this specification and in which like reference numerals designate corresponding parts throughout:

Figure 1 schematically represents the automatic program system of my invention showing the receiving station, the switching system and a plurality of automatic program devices, the receiving station and switching system being shown diagrammatically in detail.

Fig. 2 is a diagrammatic representation of one of the automatic program devices used in my system.

Fig. 3 is a top plan view of the mechanical arrangement of a program record disc and a pick-up device employed therewith schematically shown in Fig. 2; and Fig. 4 is a side elevation of the representation of Fig. 3.

In my copending application Serial No. 522,090, filed March 12, 1931, and entitled "Selective program system" I have disclosed a system for the distribution of programs to a plurality of receiving stations by automatic means in which the program signals are reproduced from recordings on photographic film. My present invention contemplates providing a system in which an operator at a program receiving station can select, by automatic means, any one of a plurality of programs recorded upon phonograph records. According to my invention, I provide a plurality of automatic program devices each of which comprises a phonograph recording and automatic means for reproducing a program from the recording under control of an impulse device at a program receiving station which is removed from the geographic vicinity of the automatic program devices. The automatic program devices employed in my invention are of a novel type which automatically reset themselves for another playing operation and which initiate switching operations at the expiration of a program, for establishing a disconnect circuit to a step-by-step selector.

Fig. 1 shows the circuit arrangement of one embodiment of the automatic program system of my invention. An electrical translating device, such as loud speaker 12 is connected to an amplifier 14. The amplifier 14 is a resistance-capacitance coupled multi-stage thermionic amplifier, well known in the art, and is electromagnetically coupled to an inductance 15 in series with an impulse device 16. The impulse device 16 is of a conventional type such as used in automatic telephony and comprises a dial, cam, and switch adapted to interrupt a circuit to produce a sequence of electrical impulses corresponding to a "dialed" number. A program line 1 extends from the inductance 15 in the receiving station 2 to a battery 25 which is part of the switching system 3 which in practice may be remotely situated from the receiving station 2. This program line is extended from the battery to a relay armature 21 and thence through a flexible lead to a wiping contact 26 mounted on a rotatable arm 27 which forms part of a step-by-step selector, well known in automatic telephony. The arm 27 is mounted on a rotatable ratchet wheel 28. A tension spring 29 is provided to hold the arm 27 normally against a stop pin 30. An arm 31 is pivotally mounted adjacent an electromagnet 23 and is adapted to rotate the ratchet wheel 28, one ratchet tooth each time the magnet 23 is energized. The arm 27 is provided with another wiping contact 32. The contacts 26 and 32 are adapted to make contact with an arcuate group of contacts 33, 34, 35, 36, 37 and 38, positioned about the center of the ratchet wheel 28. When the arm is at rest against the stop-pin 30, the contacts 26 and 32 are not in engagement with any of these contacts. Each separate energization of the magnet 23 advances the arm 27 to the next consecutive radial pair of contacts of the group 33, 34, 35, 36, 37 and 38. A spring holds the arm 31 away from the ratchet wheel 28 when the magnet 23 is deenergized. A pawl 39 is normally held in engagement with the teeth of the ratchet wheel 28 and prevents the spring 29 from returning the arm 27 to the stop-pin 30 as the ratchet wheel 28 is being actuated. A slow-to-release magnet 22 is provided adjacent the pawl 39 for releasing the same at the proper time so that the arm 27 can be returned to its initial position against stop-pin 30. It is to be understood that the foregoing arrangement comprising a step-by-step selector is here shown in elementary form only, the construction of the same being well known in automatic telephony.

A magnet 18 is connected to the battery 25 and is under control of the impulse-sending device 16. An armature under control of the magnet 18 actuates the contacts 24 and 20 which are closed when the magnet 18 is deenergized. That is, the contacts 24 and 20 are closed when the line to battery 25 is interrupted by the impulse-sending device 16. The contacts 24 control the current from battery 40 to the magnet 23. The contacts 20 control the current from battery 41 to magnet 19. The magnet 19 is of the slow-to-release type provided with a copper collar on its core which serves to maintain the flux in the core for some time after the current has been interrupted. Such slow-to-release magnets are well known in automatic telephony. An armature 21 positioned adjacent the magnet 19 controls the line from the battery 25 to the contact 26 on the arm 27. Another slow-to-release magnet 17 is positioned to act upon the armature 21 independently of magnet 19. The magnet 17 is connected through ground in parallel with magnet 22.

The contacts 33 and 34 are connected to automatic reproducing device 4, contacts 37 and 38 are connected to automatic reproducing device 6 and contacts 35 and 36 are connected to terminals 42 and 43 of automatic reproducing device 5. For simplicity of description, a typical example of operation of my system will be set forth in which the step-by-step selector of the switching system 3 makes connection with the automatic reproducing device 5. The operation of the switching system 3 to establish a circuit with the selected automatic reproducing device 5 is as follows:

When the subscriber at the receiving station desires to have a certain program reproduced at his receiving station, he obtains the proper calling number which corresponds to the desired program. These numbers may be arranged in an index in which the calling numbers are opposite the program titles alphabetically listed, similar to an automatic telephone directory. The subscriber then "dials" his number on the impulse-sending device 16 so that a sequence of interruptions occurs in the subscriber's circuit, which in number corresponds to the desired program number. For the purpose of the present description, the desired program number will be arbitrarily considered as number "2". In other words, it requires two interruptions by the impulse sender 16 to obtain the selection of and connection to a program producing system having a particular program listed in the index and designated "2". It is to be understood that in practice there will be a great many program producing systems and that therefore the calling number might comprise several digits. In my present description the automatic reproducing device 5 has been arbitrarily chosen as producing the program signals comprising program "2".

The two interruptions in the program line cause two interruptions through ground of the current supply from battery 25 to magnet 18. The magnet 18 upon deenergization causes the contact pairs 20 and 24 to be closed twice in succession. The contact pair 24 thereby closes the circuit through battery 40 to magnet 23 twice which accordingly moves the arm 27 around two steps into a position such that contact 26 engages contact 35 and contact 32 engages contact 36. However, at the same time, contact pair 20 has twice completed the circuit from battery 41 to the slow-to-release magnet 19. The two resultant excitations of magnet 19 act to keep the program circuit continuously broken at 21, inasmuch as the flux is maintained in the core of magnet 19 for some time after the current supply has stopped. The magnet 19 thereby keeps the program line open at 21 until the interruptions in the program line produced by the impulse sending device 16 have ceased. That is, the flux in the core of magnet 19 is maintained after the cessation of current supply for an interval longer than the interval between the constantly timed interruptions produced by sender 16.

After the arm 27 has arrived at the desired position, (which is to say, after the desired number of interruptions have been made by impulse sender 16) the program circuit will be closed at 21 thereby completing a circuit from battery 25 to terminal 42 and also circuit from magnets 17 and 22 through contact 32 to terminal 43. Terminals 42 and 43 are associated with the automatic reproducing device 5 which will now be considered in more detail. It is to be understood, of course that the automatic program devices 4, 5 and 6 are all identical except as to the program recording with which they are provided. That is, each of the automatic program devices 4, 5 and 6 is adapted to furnish a different program or selection.

In Fig. 3 a phonograph disc 50 is mounted upon a rotatable plate 51. The disc 50 is of a type well known in the art and comprises a disc shaped member having a recording therein comprising a continuous spiral shaped groove 64 beginning near the outer edge of the disc. The plate 51 is secured upon a shaft 52 which extends through base member 53 and is rotatably mounted in bearing member 54. A worm gear 55 is rigidly mounted on shaft 52 and engages with a worm wheel 56 secured to a shaft 57 extending from the motor 58. An electromagnetic pickup device 59 is mounted upon an arm 60 pivotally mounted at 61 to a plate 62. The pickup device 59 is provided with a needle 63 which engages in the spiral groove 64 for transmitting to the pickup device 59, the vibrations produced by the irregularities in the groove 64 which correspond to equivalent acoustical vibrations. The pickup device 59 is adapted to transform these vibrations into equivalent electrical energy through an associated amplifier circuit. The arm 60 is provided with an armature 65 which is positioned in the field of an electromagnet 66 secured to the plate 62. Energization of magnet 66 causes the arm 60 to lift the pick-up device 59 up off the disc 50. The plate 62 is pivotally mounted upon bearing member 67 by means of pin 68 and is adapted to swing in a plane at right angles to the plane of angular movement of the arm 60 about pivot 61. This permits the pickup device 59 to follow the groove 64 and swing in towards the center of the disc 50 as the program recorded thereon is being reproduced.

A toothed sector 70 is rigidly secured to plate 62 and engages with a rack 71 which is integral with a plunger armature 72. The armature 72 is slidably positioned within a solenoid 73 mounted upon the base member 53. To reproduce a program, the motor 58 is made to rotate the disc 50. The needle 63, being in engagement with the groove 64, will cause the pickup device 59 to swing in towards the center as the disc 50 is rotated. This action causes the toothed sector 70 to draw the rack 71 and plunger armature 72 partly out of the solenoid 73. When the needle 63 has reached the end of the recording at the limit of movement of the groove 64 near the center of disc 50, the electromagnet 66 and the solenoid may both be energized. The simultaneous energization of the electromagnet 66 and the solenoid 73 will cause the arm 60 to lift the needle 63 off the disc 50 and will cause the plunger armature 72 to be drawn into the solenoid 73 thereby swinging the plate 62 around the axis of the pin 68 into an initial or starting position at the beginning of the groove 64. In such a manner may the pick-up device 59 be reset for operation at the expiration of a program recorded on the disc 50. An arm 74 is provided integral with the plate 62 and imparts movement to switches, hereinafter described, in accordance with the movement of the plate 62 as the needle 63 follows the spiral groove 64 towards the center of the disc 50.

The disc 50 and its associated elements as shown in Figs. 3 and 4 are employed in the automatic reproducing device 5 in conjunction with a switching organization which will best be disclosed from its function in the operation of my automatic program system for the reproduction of a recorded program which is as follows:

Referring to Figs. 1 and 2, after the selective dialing manipulation of the impulse device 16 has been performed, the selector arm 27 will be in a position such that contacts 26 and 32 will be in contacting engagement with the selected contacts 35 and 36, respectively. When the slow-to-release magnet 19 releases the armature 21, a circuit will be established from battery 25 through terminal 42 through contact springs 76 and 77, and through the magnets 80 and 81 to ground. The magnets 80 and 81 will therefore be energized and attract armatures 82 and 83, respectively. When magnet 81 attracts armature 83 the circuit will be broken from a battery 84 to a slow-to-release magnet 85. At the same time, when magnet 80 attracts armature 82 the contact springs 86 will be closed thereby completing a circuit through armature 87 (now closed), and through battery 88 to two holding magnets 89 and 93. Another circuit will also be completed from a source of electrical energy 90 through contact springs 91 to the motor 58 whereupon the disc 50 will be rotated. After a slight delay, the slow-to-release magnet 85 will release the armature 92 which will act to disengage contact springs 76 and 77 and to engage contact spring 78 with contact spring 79. The engagement of contact springs 78 and 79 completes a circuit from the terminal 42 through an amplifier 94 to the electrical pickup device 59. When the spring contacts 76 and 77 are disengaged the circuit from battery 25 to the magnets 80 and 81 will be broken. However, a circuit has now been established from battery 88 to the two holding magnets 89 and 93 which now hold the armatures 82 and 83, respectively.

As the disc 50 is rotated, the program recorded thereon will be picked up by the pickup device 59, amplified by the amplifier 94 and transmitted to the amplifier 14 and translating device 12 whereupon the selected program will be reproduced at the receiving station. As the disc 50 rotates, the spiral groove 64 thereon causes the needle 63 to slowly move the pickup device 59 and associated supporting elements in an arc towards the center of the disc 50. When this movement is started, that is, immediately following the beginning of the rotation of the disc 50, the arm 74 is moved far enough to permit contact springs 95 to disengage and contact springs 96 to engage. At the expiration of the program when the needle 63 has reached the end of the spiral groove 64 at a point near the center of the disc 50, the plate 62 will have been swung about the axis of the pin 68 to a position such that the sector 70 will have drawn the plunger armature out of the solenoid 73. At the same time, the arm 74 will have been moved thereby into a position such that contact pairs 97, 98 and 99 will be in engagement.

Closing of contacts 99 will complete a circuit from battery 101 through contacts 96 which are now closed, to holding magnet 102. Magnet 102 then holds armature 103 which maintains contact pairs 97, 98, and 99 in a closed condition. Contacts 97 are now closed, but the circuit therefrom is broken at contacts 95 which are now open. When contacts 98 are closed a circuit is completed from battery 104 to magnet 105. Magnet 105 then attracts armature 106 which closes contact pairs 107 and 108. Closing of contacts 108 completes a circuit from battery 109 to magnet 66 which lifts the needle 63 off of the disc 50, while the closing of contacts 107 completes a circuit from battery 110 to solenoid 73. Solenoid 73 is then energized and draws in the plunger armature 72 which causes the rack 71 to move the sector 70 into its initial position where the needle 63 will be in a position at the beginning of the spiral groove 64 at the outer edge of the disc 50. When the plate 62 is moved by the solenoid 73 into this initial position, the arm 74 will cause contacts 96 to disengage and contacts 95 to engage (in the position shown in Fig. 2). However, contacts 95 and contacts 96 are positioned with reference to the arm 74 in a manner such that contacts 95 will engage before contacts 96 disengage as the arm 74 is moved into its initial or starting position by action of solenoid 73.

When contacts 95 engage, a disconnect circuit will be established from battery 100 through contacts 97 (now closed) through magnet 112 to terminal 43, and thence through contact 32 in Fig. 1 to the two slow-to-release magnets 22 and 17. The magnet 17 immediately breaks the circuit to the translating device 12 at the armature 21, while the magnet 22 causes the pawl 39 to disengage from the ratchet wheel 23 whereupon the spring 29 causes the arm 27 to return to an initial position at rest against stop-pin 30. The translating device 12 will then be completely disconnected from any of the automatic program devices, and the selector arm 27 will be in a position such that it may be stepped around to a desired position by the magnet 23 under control of the impulse device 16.

Referring again to Fig. 2, when the contacts 95 engage, the magnet 112 will also be energized whereupon the armature 87 will open the circuit from battery 88 to the two holding magnets 89 and 93. When the magnets 89 and 93 are de-energized, the contacts 91 will be opened, thereby breaking the circuit to the motor 58, and contacts 86 will be closed, while the armature 83 will close the circuit from battery 84 to magnet 85 which actuates armature 92 and establishes contacts 76, 77, 78, and 79 in their proper relation for another cycle of operations. It will be noted that, when contacts 76 and 77 are thus finally closed, the terminal 42 will not be in circuit with the contact 26, as the arm 27 has now been released by magnet 22.

When contacts 96 are moved out of engagement with each other, the circuit from battery 101 to magnet 102 will be broken. When the magnet 102 is de-energized the armature 103 will be released whereupon contacts 97, 98 and 99 will all be disengaged. When contact 98 is disengaged, the circuit from battery 104 to magnet 105 will be broken. When magnet 105 is de-energized, the armature 106 will be released thereby disengaging contacts 107 and 108. When contacts 107 are disengaged the solenoid 73 will become de-energized, while, when the contacts 108 are disengaged, the magnet 66 will become de-energized thereby allowing the needle 63 to come to rest upon the disc 50 in engagement with the spiral 64.

When the contacts 97 disengage, the circuit from the battery 100 to magnet 112 and terminal 43 will be broken and the magnet 112 will become de-energized. The entire system will now be in condition for a complete repeat operation. That is, the operator or subscriber at the receiving station 2 can manipulate his impulse device 16 to cause the magnet 23 to make the arm 27 establish connections with any desired one of the automatic program devices to reproduce a recorded program at the translating device 12.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. In a program system, a phonograph record having a program recorded thereon, an electrical pickup device for engaging with said record, a translating device, means for establishing an electrical circuit between said pickup device and said translating device, means controlled by the movement of said pickup device on said record for electrically disconnecting said translating device from said pickup device at a predetermined time, and means controlled by the movement of said pickup device on said record for moving said pickup device from a point on said record corresponding to the end of said program to a point on said record corresponding to the beginning of said program.

2. In a program system, a phonograph recording having a program recorded thereon, an electrical pick-up device for engaging with said recording, a translating device, an impulse device, switching means under control of said impulse device for establishing a circuit between said pick-up device and said translating device, means for disconnecting said translating device from said pick-up device at a predetermined time, and means operated at a predetermined time for lifting said pick-up device from the surface of said recording and moving said pick-up device to another part of said recording.

3. In a program system, a plurality of automatic reproducing devices each of which is adapted to recurrently reproduce a program of predetermined duration, a translating device, an impulse device, a selector switch under control of said impulse device for connecting said translating device to a selected one of said automatic reproducing devices for reproduction of a desired program, and means for normalizing said selector to disconnect from said selecting reproducing device at the expiration of one program reproduction.

4. In a program system, a phonograph recording having a program of predetermined duration recorded thereon, a pick-up device for producing program signals from said recording, automatic means for moving said pick-up device to recurrently traverse said recording in a reproducing process, a translating device, switching means for connecting said translating device to said pick-up device, and means for electrically disconnecting said pick-up device from said translating device, said last mentioned means being under control of said automatic means.

5. In a program system, a phonograph recording having a program of predetermined duration recorded thereon, a motor for driving said phonograph recording, a pick-up device for producing program signals from said recording, automatic means for moving said pick-up device to recurrently traverse said recording in a reproducing process, relays for initiating the operation of said automatic means for causing said pick-up device to traverse said recording a single time for producing program signals therefrom, an amplifier connected with said pick-up device, a receiving station remotely situated from said automatic means, and including a program translating device, an impulse device in the vicinity of said translating device, a selector including a movable contactor for selective engagement with contacts of different groups of contacts at least one at a time from each group, a connection from a certain contact of one of said groups through a subsidiary relay for causing the energization of said relays for initiating the operation of said automatic means whereby said motor is energized, means operated at said initiation of operation of said automatic means for causing the energization of said subsidiary relay for disconnecting said contact from said first mentioned relays and for connecting said contact with said amplifier whereby program signals from said pick-up are transmitted through said selector to said translating device at said receiving station, a switch connected between said selector and said translating device, an electromagnet for operating said switch, and an energization circuit connected through contact of the other group of contacts of said selector to said electromagnet of said last mentioned switch for actuating said switch to disconnect said translating device from said selector at the expiration of a program, said energization circuit being controlled by the movement of said pick-up device, and means for interrupting the circuit to said motor and for normalizing said selector at said expiration of said program.

6. In a program apparatus, a movable arm, an electrical pick-up unit for engagement with a record and movably mounted on said arm, and electromagnetic means mounted solely on said arm for moving said pick-up unit.

7. In program apparatus, a pick-up unit movable relative to a program record, switching means mechanically operable by the movement of said pick-up unit, and electromagnetic means for operating said switching means in addition to the operation thereof by the movement of said pick-up device.

8. Program apparatus comprising, a program circuit, program signal producing means including an electrical pick-up device and movable mechanism associated with said pick-up device in producing program signals, control circuits normally connected with said program circuit and subject to energization thereby for controlling said movable mechanism, and automatic means operable after predetermined control of said movable mechanism by said control circuits for effectively disconnecting said control circuits from said program circuit for the effective connection of said pick-up device thereto for the transmission of program signals over said program circuit.

9. Film apparatus in accordance with claim 8 including means for automatically causing the interdependent effective disconnection of said pick-up device from said program circuit and the restoration of said control circuits to connection with said program circuit for control thereby.

10. A control system comprising, means for producing program signals, means for producing controlling signals in addition to said program signals, a program signal circuit, a control signal circuit, and means for causing said means for producing controlling signals to energize said control signal circuit at predetermined times with respect to the transmission of program signals over said program circuit.

11. A control system comprising, means for producing and transmitting intelligence signals, other means for producing and transmitting apparatus controlling signals in addition to said intelligence signals, said last mentioned means including a plurality of interlocking or interconnected circuits, and means for automatically sequentially controlling said circuits at different predetermined times with respect to the production and transmission of said intelligence signals.

12. A program system comprising, apparatus for producing and transmitting intelligence signals, an intelligence signal transmission circuit, mechanically operable apparatus situated at another point for controlling said last mentioned circuit, and circuit means for producing a controlling effect upon said last mentioned apparatus, said circuit means having a plurality of elements settable at different times in accordance with different conditions of operation of said intelligence signal producing means.

13. A control system comprising, intelligence signal means including movable electromagnetic actuating means, circuits for controlling said electromagnetic actuating means, relay means for controlling the energization of said electromagnetic controlling circuits, and an energizing circuit for said relay means, said movable means of said intelligence signal means being operable to sequentially control said relay energizing circuit at a plurality of different predetermined conditions of operation of said intelligence signal means.

14. A control circuit comprising, an intelligence signal circuit, apparatus for producing intelligence signals for said circuit in which mechanical motion is produced during the production of said signals, circuits operatively associated with said signal circuit in the production and utilization of said intelligence signals and including switches subject to actuation by said mechanical movement, electromagnetic means for also controlling said switches, and circuits controlled by said switches for controlling said electromagnetic means.

15. A control system comprising, intelligence signal apparatus including an electric driving motor, an energizing circuit to said motor, momentarily energizable means for controlling said energizing circuit to initiate the operation of said motor, other energizable means for maintaining the completion of said energizing circuit to operate said motor during the transmission of intelligence signals and subject to initial control by said momentarily energizable means, and means operated at a predetermined time in the duration of said transmission of intelligence signals for deenergizing said second mentioned energizable means.

16. A control system comprising, a signal transmission circuit, intelligence signal means for producing signals for transmission over said circuit and comprising apparatus capable of assuming a plurality of control positions and a driving motor, an energizing circuit for controlling said motor, other apparatus operatively associated with said signal circuit at another point, and commonly energized means operated by the movement of said signal producing means from one position to another for effecting the control of said motor energizing circuit and said apparatus at said other point.

17. A control system comprising, motor driven intelligence signal apparatus having elements operative in a plurality of different positions during the transmission of signals, a circuit operable in two directions between said signal apparatus and a remote point, in one direction to said signal producing apparatus the circuit being operative for controlling the operation of said apparatus, and in the other direction said circuit being operative to transmit intelligence signals from said apparatus to said remote point, means for changing the condition of said circuit from a controlled condition to a controlling condition, and means operable after predetermined transmission of intelligence signals for controlling said last mentioned means.

18. A control system comprising, intelligence signal apparatus including motor driven means and a plurality of electromagnets, circuits for controlling said electromagnets, a circuit interconnecting said signal apparatus and apparatus at a remote point, said circuit being operative from said remote point to said signal apparatus for effecting the control thereof and from said signal apparatus to said remote apparatus for effecting the control of said remote apparatus, controlling means for changing said circuit from one of said conditions to another, and circuit means operatively interconnecting said controlling means and said electromagnet control circuits for interdependent operation.

19. In a signal system, separated stations interconnected by a closed transmission line, one of said stations including a motor used for operating signal apparatus, a circuit for connecting said motor to a source of power, said circuit being normally opened during a non-signalling condition over said line, means subject to energization upon the opening and closure of said line a predetermined number of times at the other of said stations for effecting the closing of said motor circuit to energize said motor, means for rendering said last mentioned means unresponsive to control by said line subsequent to the closing of said motor circuit and during the signaling operation, and electromagnetic means subject to energization by a disconnection signal for effecting the opening of said motor circuit to deenergize said motor and for restoring said first mentioned motor controlling means to a condition again subject to control by said line.

GORDON BROWN SCHEIBELL.